C. L. NOE.

Angling-Reels.

No. 135,283.

Patented Jan. 28, 1873.

Witnesses:
A Bennerndorf
Alex F. Roberts

Inventor:
C. L. Noe
per
Attorneys.

UNITED STATES PATENT OFFICE.

CHARLES L. NOE, OF BERGEN POINT, NEW JERSEY.

IMPROVEMENT IN ANGLING-REELS.

Specification forming part of Letters Patent No. 135,283, dated January 28, 1873.

*To all whom it may concern:*

Be it known that I, CHARLES L. NOE, of Bergen Point, in the county of Hudson and State of New Jersey, have invented a new and useful Improvement in Fishing-Reels, of which the following is a specification:

My invention consists of a fan-regulator with gearing connecting it with the reel-gear combined with the reel, to prevent it from overrunning the line by its momentum when the hook is cast.

Figure 2:
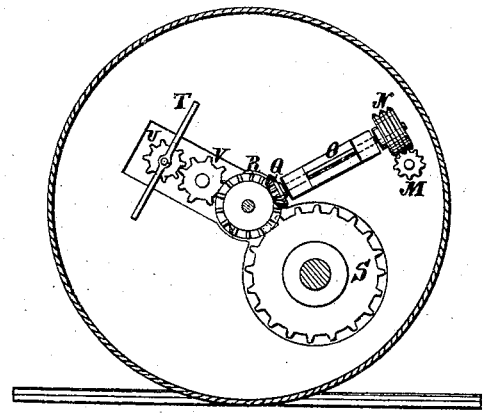
Figure 3:
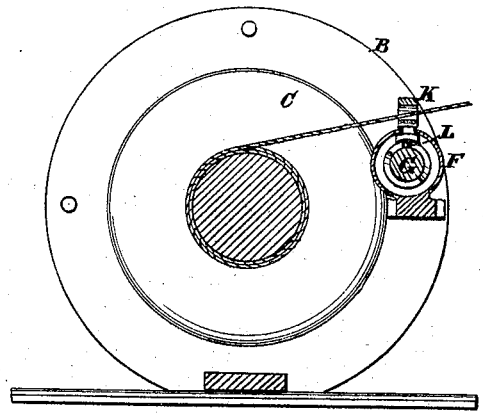
Figure 1:
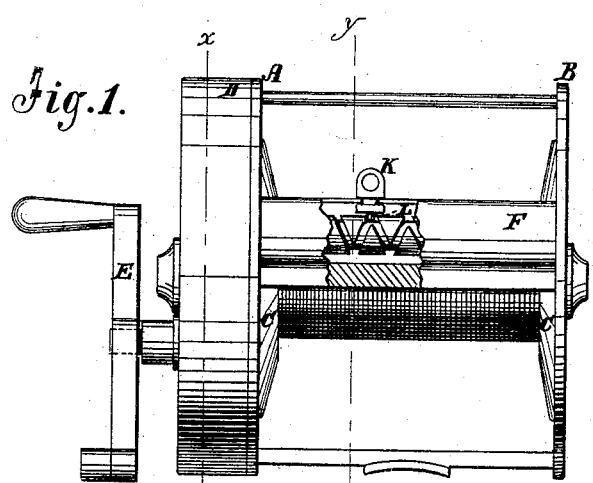
Figure 4:

Figure 1 is a front elevation of a fishing-reel with my improvements applied to it; Fig. 2 is a transverse section taken on the line $x\,x$ of Fig. 1; Fig. 3 is a transverse section taken on the line $y\,y$; and Fig. 4 is a plan of the screw for traversing the guide.

Similar letters of reference indicate corresponding parts.

A and B represent the disks inclosing the spool-heads $c$. D represents the case on one of the disks for concealing the gear for driving the spool by the hand-crank E. F is a tubular case arranged parallel with the spool between the disks A B, and supported by them, in which is a cylinder, G, with reverse spiral grooves H I, for traversing the cord-guide K forward and back by a shifting-foot, L, on the guide, which projects through a slot in the tube F into the spiral grooves, while the guide is fitted to the slotted tube F so as to slide forward and back on it. The changes by which the movements of the guide are reversed are effected by the turning of the shifting-foot L in the curves L', where the slots H I meet at the ends. The axis of cylinder G extends through disk A into the space inclosed by cap D, and has a small pinion, M, thereat, with which a worm, N, on the shaft O gears, and the shaft gears with the reel-arbor by the wheels Q R to actuate the cord-guide by the reel-crank E, which turns the wheel R by the large wheel S. T is a fan-regulator or brake for stopping the reel as soon as the hook strikes the water, to prevent the unwinding of more than is required by the overrunning of the reel by its momentum. This fan is also arranged in the case D, and gears with the reel-shaft by its pinion U and idle-wheel V and the wheel R.

I do not limit myself to any particular arrangement of gearing to connect the fan with the driving-gear, as various arrangements may be readily contrived by one skilled in the art that will answer as well.

Having thus described my invention, I claim as new and desire to secure by Letters Patent—

The combination, with a fishing-reel, of a fan-regulator, T, and actuating devices connecting it with the reel-actuating gear, substantially as specified.

CHARLES L. NOE.

Witnesses:
T. B. MOSHER,
ALEX. F. ROBERTS.